US012329336B2

(12) United States Patent
Eckhardt

(10) Patent No.: US 12,329,336 B2
(45) Date of Patent: Jun. 17, 2025

(54) REMOTE-ACCESS DUSTER

(71) Applicant: Richard Eckhardt, Arlington, MA (US)

(72) Inventor: Richard Eckhardt, Arlington, MA (US)

( * ) Notice: Subject to any disclaimer, the term of this patent is extended or adjusted under 35 U.S.C. 154(b) by 37 days.

(21) Appl. No.: 18/374,150

(22) Filed: Sep. 28, 2023

(65) Prior Publication Data

US 2024/0016359 A1 Jan. 18, 2024

Related U.S. Application Data

(63) Continuation of application No. 16/894,833, filed on Jun. 7, 2020, now Pat. No. 11,805,954.

(60) Provisional application No. 62/956,934, filed on Jan. 3, 2020, provisional application No. 62/859,228, filed on Jun. 10, 2019.

(51) Int. Cl.

| | |
|---|---|
| ***A47L 11/40*** | (2006.01) |
| ***A47L 7/02*** | (2006.01) |
| ***A47L 9/04*** | (2006.01) |
| ***A47L 13/40*** | (2006.01) |
| ***B08B 6/00*** | (2006.01) |

(52) U.S. Cl.

CPC ............ *A47L 11/4047* (2013.01); *A47L 7/02* (2013.01); *A47L 9/0444* (2013.01); *A47L 11/4005* (2013.01); *B08B 6/00* (2013.01); *A47L 13/40* (2013.01)

(58) Field of Classification Search

CPC ...... A47L 11/4047; A47L 7/02; A47L 9/0444; A47L 11/4005; A47L 13/40; A47L 9/0461; A47L 13/38; A47L 5/36; B08B 6/00

See application file for complete search history.

(56) References Cited

U.S. PATENT DOCUMENTS 11,805,954 B2 * 11/2023 Eckhardt .................. B08B 6/00

* cited by examiner

*Primary Examiner* — David Redding
(74) *Attorney, Agent, or Firm* — Brian M. Dingman; Prince Lobel Tye LLP

(57) ABSTRACT

A remote access duster with a body, a flexible duster cord loop that is configured to be propelled such that part of the loop moves outward from the body while another part moves inward toward the body, and a vacuum source that is configured to draw air over the cord.

20 Claims, 7 Drawing Sheets

REMOTE-ACCESS DUSTER

CROSS-REFERENCE TO RELATED APPLICATIONS

This application is a continuation of and claims priority of application Ser. No. 16/894,833, filed on Jun. 7, 2020, now U.S. Pat. No. 11,805,954, which itself claimed priority of Provisional Patent Application 62/859,228 filed on Jun. 10, 2019, and to Provisional Patent Application 62/956,934 filed on Jan. 3, 2020. The disclosures of each of these prior applications are incorporated by reference herein.

BACKGROUND

This disclosure relates to a hand-held duster.

Household dusting is the process of removing dust and lint that accumulates on the surfaces of furniture, fixtures, woodwork, decorations, etc. Historically, this process has been done using a "mechanical" duster that uses an array of small fibers to mechanically move the dust from the surface or to electrostatically attract the dust from the surface to the fibers. If the dust and lint is removed mechanically, it will typically fall to a lower level such as the floor and then be removed by other means. If it is collected electrostatically, the duster needs to be periodically cleaned, typically by taking it outside and shaking the dust off. Alternatively, a vacuum cleaner can be used to collect dust from some surfaces.

Dusting techniques have changed little in the last 50 years. Manual "mechanical" dusting requires that a hand duster be manipulated to all the locations where dust accumulates, many of which are in high places or tight spaces that are difficult to reach. Unless an electrostatic duster is used, the dust is pushed off the surface to fall to a lower surface and/or distributed back into the air. The dust which has been moved to lower surfaces will eventually have to be cleaned up by other means; however, the dust that remains in the air can re-settle on surfaces already dusted.

Electrostatic manual dusters offer the advantage of collecting the dust on the fibers of the duster so there is minimal distribution of the dust into the air. During use, the fibers of the electrostatic duster gradually lose their static charge and the dust begins to fall off. Before this happens, the duster must be taken to a place (such as outside the house) where the dust can be shaken off. Then the electrostatic charge must be restored. In some configurations this occurs during the shaking, and in others it is done by rubbing the fibers against another material.

A vacuum cleaner can be used to remove dust from some surfaces, but it has significant limitations. Suction alone will often not remove all the dust sticking to surfaces. Brush-type attachments are typically used with the vacuum cleaner to mechanically loosen the dust from the surface so it can be drawn up by suction. Suction only collects the dust from an area very close to the end of the nozzle, so the brush can only extend a short distance. This makes it difficult or impossible to reach dust-covered surfaces of intricate objects such as light fixtures, chandeliers, picture frames, window blinds, etc. Also, the vacuum nozzle tends to be heavy and rigid and is difficult to manipulate around delicate objects. The suction of the vacuum cleaner can also draw in and damage light weight objects, such as fabrics, thin plastic sheets, lamp shades, chandelier parts, etc.

SUMMARY

The remote access duster of the present disclosure is an apparatus that combines the features and benefits of the various dusting techniques currently used along with an automated system for the collection and disposal of dust and lint. It also provides a long reach for the user with a very delicate touch to remove dust from all the surfaces of intricate and delicate objects. The remote access duster includes electrostatic attraction of dust along with a continuous system to remove dust and lint from the dust-collection fibers and to restore the electrostatic charge on the fibers.

The remote access duster uses a soft, flexible cord covered with fibers for dusting. The fibers in the remote access duster cord are similar to those used in standard electrostatic hand dusters, but they are attached to a flexible core, rather than the rigid or semi-rigid core used in traditional dusters. This dusting cord is arranged in a loop that is driven with a sufficiently high velocity that the inertia of the cord causes it to continue moving outward from the duster body in any direction it is pointed, including upward. As the dusting cord is driven out from the duster body, the fibers of the cord are electrostatically charged so that they will attract dust and lint. When the cord comes in contact with any surface, the motion of the fibers dislodges the dust from the surface and the dust is electrostatically attracted to the cord and off the surface. The flexibility and rapid motion of the dusting cord allow it to quickly reach all surfaces of intricate and delicate objects without applying high forces that might damage the objects.

Since the duster cord is in a loop, when it has been driven outward approximately half its total length, it is pulled back to the duster body to loop around again. As the duster cord passes through the duster body, suction from a vacuum cleaner style system draws air across and through the duster cord to remove the dust and lint that was electrostatically attached to it. After the dust is removed, the electrostatic charge on the duster cord is replenished before it is driven outward again. The dust and lint that was removed from the duster cord is drawn into a storage compartment with a filter much like a traditional vacuum cleaner. This dust storage compartment can be conveniently emptied later when the dusting tasks are completed.

All examples and features mentioned below can be combined in any technically possible way.

In one aspect, a remote access duster includes a body, a flexible duster cord loop that is configured to be propelled by a mechanism such as an electric motor such that part of the loop moves outward from the body while another part moves inward toward the body, and a vacuum motor, wherein the vacuum motor is configured to draw air over the cord.

Some examples include one of the above and/or below features, or any combination thereof. In an example, the remote access duster further comprises a structure in the body that is adapted to create a static electric charge on the cord. In an example, the structure in the body that is adapted to create a static electric charge on the cord comprises a plate that is positioned such that the cord contacts the plate. In an example, the cord comprises a core that carries fibers, wherein the fibers comprise a first material and the structure in the body that is adapted to create a static electric charge on the cord comprises a second material, and wherein the first and second materials are in different locations of the triboelectric series. In an example, the remote access duster further comprises a cord drive wheel configured to be driven by a drive motor, wherein the cord is propelled by the drive wheel. In an example, the drive wheel comprises a plurality of openings, and the vacuum motor is configured to draw air over the cord and through the openings. In an example, the body is configured such that there are no tight crevices that can be contacted by the cord. In an example, the cord comprises a core covered with projecting fibers.

In another aspect, a remote access duster includes a body, a flexible duster cord loop that is configured to be propelled by a mechanism such as an electric motor such that part of the loop moves outward from the body while another part moves inward toward the body, and an adapter that is configured to couple the body to a vacuum cleaner such that air is drawn over the cord.

Some examples include one of the above and/or below features, or any combination thereof. In an example, the remote access duster further comprises structure in the body that is adapted to create a static electric charge on the cord. In an example, the structure in the body that is adapted to create a static electric charge on the cord comprises a plate that is positioned such that the cord contacts the plate. In an example, the cord comprises a core that carries fibers, wherein the fibers comprise a first material and the structure in the body that is adapted to create a static electric charge on the cord comprises a second material, and wherein the first and second materials are in different locations of the triboelectric series. In an example, the remote access duster further comprises a cord drive wheel configured to be driven by a drive motor, wherein the cord is propelled by the drive wheel. In an example, the drive wheel comprises a plurality of openings, and the vacuum is configured to draw air over the cord and through the openings. In an example, the body is configured such that there are no tight crevices that can be contacted by the cord. In an example, the cord comprises a core covered with projecting fibers.

In another aspect, a remote access duster includes a body, a flexible duster cord loop that is configured to be propelled such that part of the loop moves outward from the body while another part moves inward toward the body, and a vacuum source that is configured to draw air over the cord.

Some examples include one of the above and/or below features, or any combination thereof. In an example, the remote access duster further comprises structure in the body that is adapted to create a static electric charge on the cord. In an example, the remote access duster further comprises a cord drive wheel configured to be driven by a drive motor, wherein the cord is driven by the drive wheel. In an example, the drive wheel comprises a plurality of openings, and the vacuum source is configured to draw air over the cord and through the openings.

DETAILED DESCRIPTION

Figure 1:
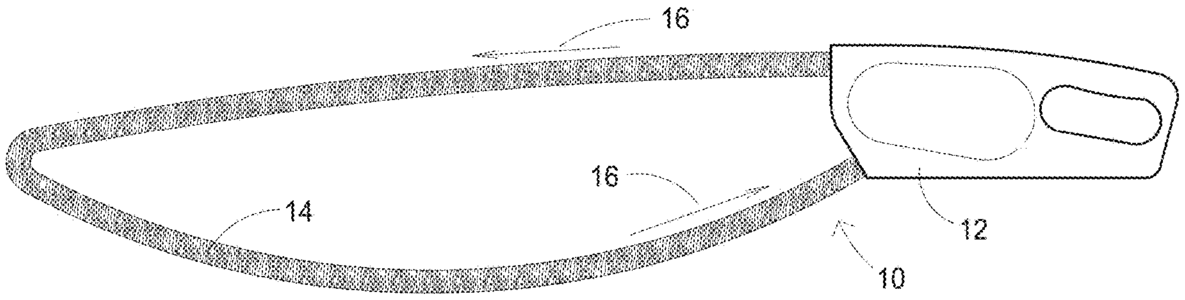
FIG. 1 illustrates a remote access duster in operation with the duster cord extending out from the duster body. The duster body is held by the user to direct the position of the duster cord.
Figure 2:
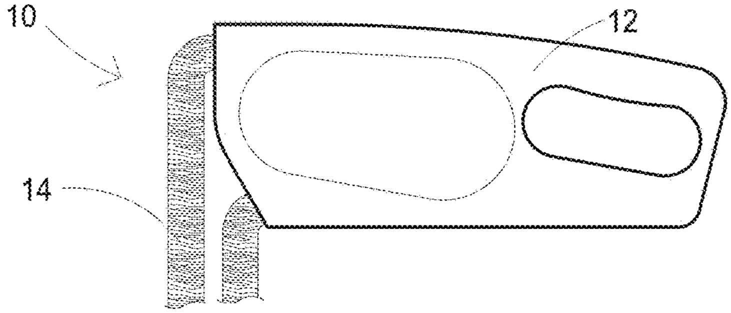
FIG. 2 shows the remote access duster when it is turned off. The duster cord is soft and flexible and dangles from the duster body.

The remote access duster 10 is shown in operation in FIG. 1 and turned off in FIG. 2. Duster cord loop 14 is driven (propelled) away from and back toward body 12, in the direction of arrows 16. Cord 14 is flexible so when the cord drive is turned off the cord dangles from the duster body as shown in FIG. 2.

Exemplary Duster Cord Construction

The duster cord is made with a flexible core with fibers protruding from it that can be used to dislodge and attract dust and lint from surfaces. The central core of the cord must be flexible and durable enough to withstand many thousands of cycles of movement through the duster. The fibers extending out from the central core will typically be 1 to 5 cm long and of a material that is also durable enough to withstand a long life of movement through the duster. The fibers must also be made of a material that can be statically charged to attract dust. Fiber material such as polyester microfiber, among others, meets all these requirements.

There are many possible construction techniques that can meet these requirements for the duster cord. One construction technique is that which is used to make decorative feather boas. In this technique, feathers (or faux feathers made of polymer fibers) are woven or braided together with a core made of one or more strings. Duster cords could be made using this technique though natural feathers may not be as durable as polymer fibers. This construction technique with somewhat more durable materials than those used for decorative purposes could be used for the duster cord.

Another existing manufacturing technique that could be used to make the duster cord is that which is used to make decorative fabric trim, such as pom-pom garland. Pom-pom garland is made with a woven or braided central string or thread core with periodic tufts of fibers extending outward from the central cord. The manufacturing process for this garland can be adjusted to produce continuous fiber tufts all along the length, rather than periodic tufts with sections of the exposed central core between them. This construction technique can be used with appropriate fibers, such as polyester microfiber, for the "continuous tuft" to make the duster cord. The cord string or thread used in this type of garland is typically quite durable and can easily be made with acceptable strength to be used for the duster cord without additional modification to the manufacturing process.

Another process that can be used to make the duster cord is adhering the fibers to a central core made of twisted, woven, or braided string or filament. One way to adhere the fibers is thermal bonding. For example, the melting point of polyester fibers is low enough that they can be pressed onto a cotton cord with a heated roller. The fibers can be laid across the cord extending out in both directions and the heat will melt the fibers into the cord forming a durable bond. If a high density of fibers is used, they will stand out in all directions around the central cord. A variation on this technique is to use one or more strands in the central core that are wrapped up or twisted along with the central part of the fibers. This configuration can be adhered together with an adhesive or with a welding technique, such as thermal bonding.

Duster cords can also be made from a strip of faux fur. Faux fur is made using fine polymer fibers, such as polyester microfiber, woven into or otherwise adhered to a flexible fabric backing. A strip of this material, typically 1 to 3 cm wide can be used for the duster cord. Some faux fur fabrics will naturally curl with the fur fibers on the outside and the fabric on the inside to form the core of the duster cord. Faux fur fabric backings that do not naturally curl can be manually curled and adhered to form a cord with the fur fibers on the outside. Some faux fur (though not all) is manufactured with a durable bond between the fur fibers and the backing and can be used for the duster cord without further modifications.

Driving the Duster Cord

In an example, the remote access duster operates with a mechanism in the duster body that drives the duster cord out of the duster body at a high speed (typically greater than 10-30 m/sec though this depends on the length and other characteristics of the duster cord). One method to drive the duster cord is a drive wheel that resembles a pulley. The duster cord wraps partially around this wheel inside the duster body. The wheel is driven, typically with an electric motor, at a speed that imparts the desired velocity to the cord as it exits the duster body. As the duster cord moves around with the drive wheel, centrifugal force tends to pull the cord away from the drive wheel. If the duster cord is not in close contact with the drive wheel, there is slippage between the cord and the wheel, and the velocity of the wheel is not efficiently transferred to the cord. To counteract the centrifugal force, a mechanism should be provided to hold the cord against the drive wheel.

Figure 3:
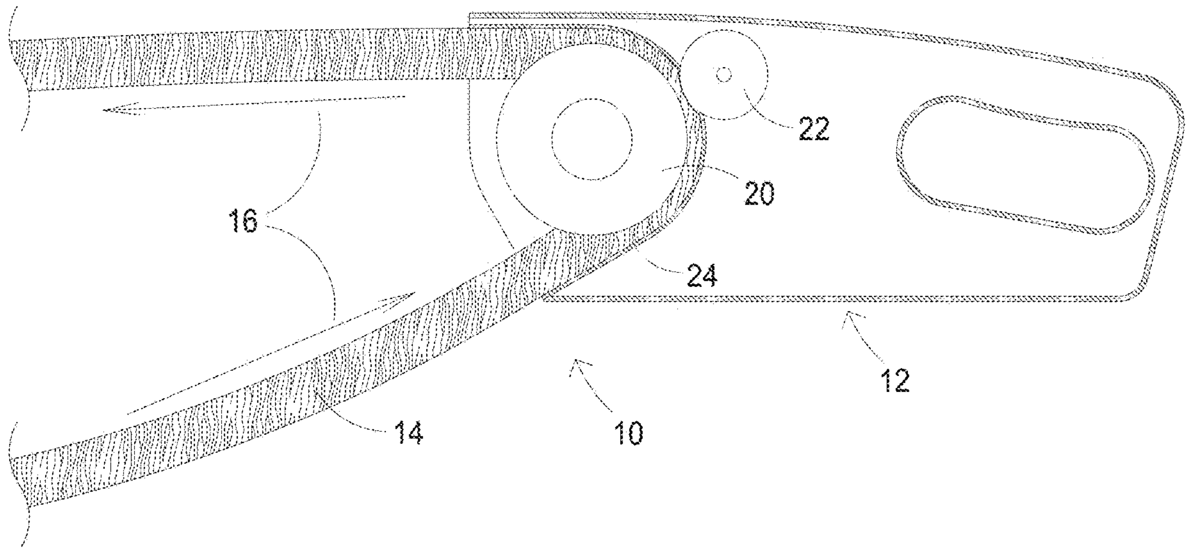
FIG. 3 shows an example of a pinch wheel that presses the duster cord against the drive wheel to minimize slippage between the drive wheel and the duster cord. The pinch wheel can be spring loaded. More than one pinch wheel or a sliding retainer can be used.

Several mechanisms are possible to keep the duster cord in contact with the drive wheel. One method is to use one or more additional wheels 22 to press the duster cord 14 against the drive wheel 20, or to pinch the duster cord between wheels. The additional wheels could be idler wheels or driven at a speed similar to the speed of the drive wheel. See FIG. 3. The wheels can be held together using a spring to provide controlled pressure. Another possibility is a passive retainer, such as a curved or straight guide 24 that presses the cord against the drive wheel. This guide could be spring-loaded to provide pressure against the duster cord for part of the rotation of the wheel to provide traction for the wheel against the duster cord.

Figure 4:
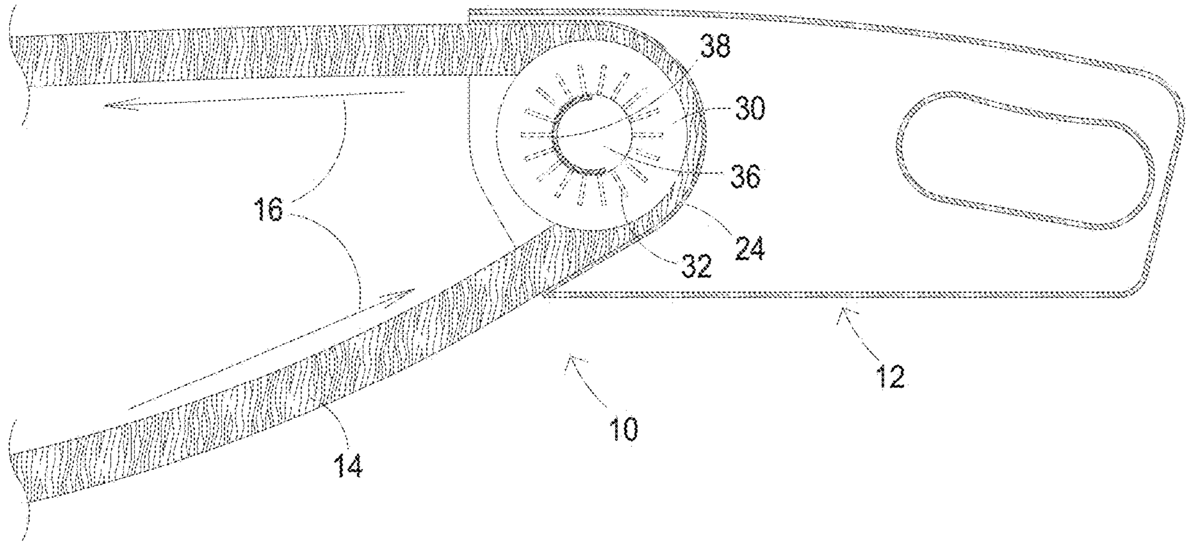
FIG. 4 shows how suction can be used to hold the duster cord against the drive wheel to minimize slippage between them. Openings between the ribs of the drive wheel allow suction to hold the duster cord against the drive wheel.

A third possibility is to use differential air pressure across the duster cord and the drive wheel to hold the cord against the drive wheel. See FIG. 4. This can be accomplished by making the drive wheel 30 with a hollow center 36 with openings to its drive surface adjacent to the duster cord, which can be accomplished using spaced ribs 32 inside of the drive wheel, to allow air flow from the cord to the center. Then a partial vacuum can be applied to the center of the drive wheel. This partial vacuum provides suction that holds the duster cord 14 against the drive wheel 30 as the drive wheel turns. A suction shield 38 can be placed inside the hub of the drive wheel so that the suction is applied to only part of the wheel. The shield does not turn with the wheel so the part with the suction remains in the same orientation as the wheel turns. This configuration results in the duster cord being held against the wheel for the part of the rotation where it is be driven, and then released from the wheel during the part of the rotation where the duster cord is outside the duster body. Alternatively, the same effect as suction can be created with an increased air pressure on the outside of the cord and drive wheel.

Another possibility for driving the duster cord is to use a jet of air to impart the required velocity to the cord. High velocity air can be blown against the duster cord and/or through a guide channel to transfer motion to the cord. This can be done in combination with a wheel for the cord to roll around, or it can be done with just a guide channel to control the direction of movement of the cord. With this technique, care must be used to contain or direct the air jet so it does not interfere with the dusting process by blowing the dust and lint into the air before it can be collected.

Another possibility for driving the duster cord is to use a mechanism that is powered by air flow. For example, a turbine can be used that is turned by the movement of air from the vacuum motor. The turbine can be used directly, or with mechanical coupling and/or gearing to drive a wheel that drives the duster cord.

Creating the Electrostatic Charge on the Duster Cord

To work most effectively, the duster cord should be electrostatically charged before it reaches the surface to be dusted. There are several possible methods to accomplish this. One method is to use the triboelectric effect where dissimilar materials acquire an electric charge when they are rubbed together or removed from contact with each other. This is the common electrostatic buildup that occurs when walking on carpet, rubbing fabrics together, combing hair, petting fury animals, etc. This is also the effect typically used to charge traditional manual electrostatic dusters. The triboelectric effect is somewhat quantified by the triboelectric series, which is a list of materials and the amount and polarity of charge they tend to acquire when contacting other materials. This series is typically listed from most positive to most negative. The largest static electric charge buildup between materials tends to occur with materials that are far apart on the triboelectric series.

There are several different methods and configurations whereby the triboelectric effect can be used in the remote access duster to create a static charge on the duster cord. One way is to mix fibers of two different materials from different positions in the triboelectric series into the duster cord. As the cord is driven around through the duster body and out to the surface to be dusted, these fibers rub together and generate a static charge on the fibers. Another configuration that can be used is to make the core or backing of the cord from one material and the fibers from another. If these materials are widely spaced on the triboelectric series, a static charge will build up on the fibers as the duster is operated. Another method that can be used to create a static charge on the fibers is to place a charging plate, made of a material from a different position on the triboelectric series than the cord fibers, next to the duster cord. As the duster cord moves, the fibers rub against the charging plate and create a static charge on the fibers of the cord. For example, if the duster cord fibers are made from polyester microfibers, which are near the bottom of the triboelectric series, a charging plate made of nylon, which is near the top of the triboelectric series, can be positioned against the fibers near the location where the duster cord exits the duster body. Alternatively, part or all of the duster cord drive wheel could be made of a material from a different position on the triboelectric series than the cord fibers. A static charge on the fibers can then be created as the duster cord passes around the wheel.

Another method for placing a static charge on the duster cord is to use an electrical ion generator. This generator can either produce free electrons (negative charge) or positive ions depending on the polarity of the generator. The generator consists of a high voltage (typically 3 to 5 kilovolts) DC power supply. One terminal of the power supply is connected to one or more discharge points near the duster cord. The other terminal is connected to a larger at least partially conductive body near or around the location of the duster cord. Electrons or ions from the point discharge(s) travel through the air to the fibers on the duster cord and impart an electric charge to them.

Removing the Dust from the Duster Cord

In operation, the duster cord is moving in a continuous loop out from the duster body to the surface to be dusted and then back to the duster body. When the duster cord passes through the duster body the dust and lint that has been attracted to the duster cord is removed from the cord and stored in a container for disposal later. In an example, this can be done with a mechanism like a traditional vacuum cleaner. This mechanism can consist of a high-speed motor with an impeller of one or more stages to create a partial vacuum. The air drawn into the impeller is pulled through the dust collection container. A filter is placed at the air outlet of the dust container to prevent the dust and lint from leaving the container and from fouling the impeller. The air flowing into the dust container is directed over the duster cord. The suction created by this air flow removes the dust and lint from the duster cord as it moves past the air intake. In this way, the duster cord is continuously cleaned by the vacuum mechanism.

In an example, the same vacuum mechanism used to remove the dust from the duster cord can also be used to hold the duster cord against the drive wheel as described previously. In this case, the air intake is directed to the hub of the drive wheel. Openings from the center of the drive wheel to the duster cord allow the air to flow through and around the cord as it runs against the rotating wheel. This allows the dust and lint to be removed from the cord as it is driven by the drive wheel.

Duster Design Considerations

To make this duster work properly, there are a number of design considerations that should be observed. First, the duster design and construction should be done in a manner that eliminates tight crevices in the duster body where the duster cord contacts it. This is desirable because the fine fibers of the duster cord can slide into the crevices and become lodged. Then, as the duster cord is pulled through the duster body, the fibers may be pulled out of the duster cord, or the lodged fibers will cause excessive drag on the movement of the cord. Also, if the fibers are pulled loose from the duster cord, it will wear out prematurely, and the loose fibers may be spread into the air, resulting in increasing lint, rather than removing it. Fibers that are lodged in the crevices may build up over time and interfere with the operation of the duster.

The elimination of crevices near the duster cord requires specific design of the duster body. The typical construction of small hand-held appliances is to use several molded plastic parts held together with snap-fits and/or screws. This construction technique results in a number of seams between the plastic components. Normally, these seams are intended to be a tight fit, though manufacturing tolerances may result in the seams being tight at some locations and with small gaps at other locations. Seams of this type can easily snag the fibers of the duster cord and should be avoided in locations where they might come in contact with the cord.

A good solution to the crevice problem is to fasten the plastic components tightly together at locations that are remote from the duster cord, and then intentionally leave significant gaps between the components where they might contact the duster cord. The gaps near the duster cord should be large enough that the fibers from the cord can move freely through the gaps without snagging.

Figure 5:
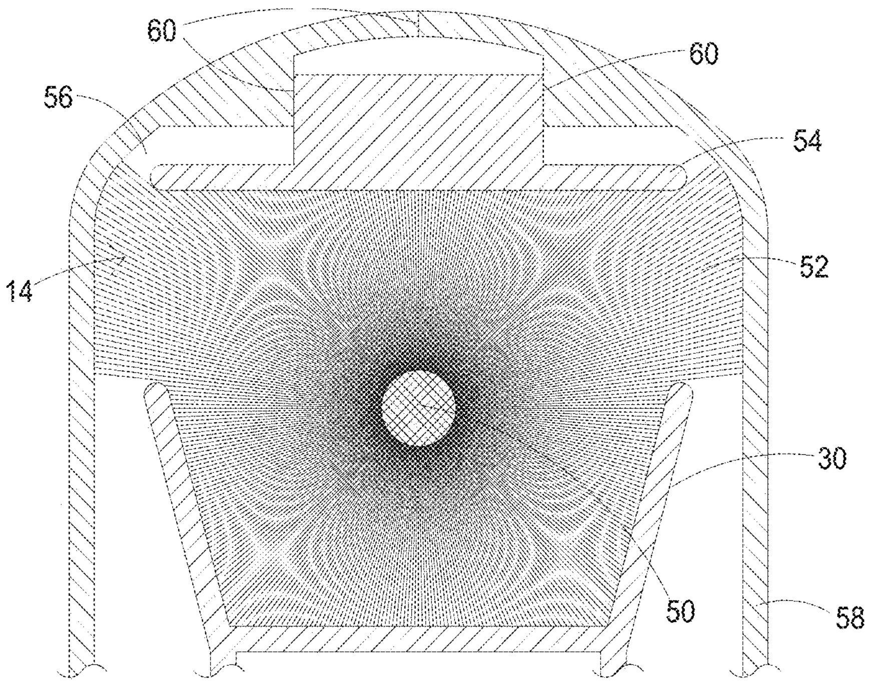
FIG. 5 shows a cross section of the remote access duster body where the duster cords exit the duster body. It shows how a protective plate can be used to keep the fibers of the cord from contacting the tight fit locations of the body components.

Another solution to the crevice problem that can be used separately or in conjunction with the previous solution is to use protective plates 54 around the duster cord 14 that prevent the fibers 52 that are attached to cord core 50 from reaching the locations where the gaps are a tight fit or might present a snagging hazard. See FIG. 5. The protective plate presents a solid surface next to the duster cord, and the edges of the plates would have significant gaps 56 to the surrounding surfaces (such as duster body shell 58) to prevent snagging. The protective plates can be tight mounted to the other components on the back side of the plate in a location where the fibers of the duster cord cannot reach, as illustrated by tight fits 60. This technique can be used with the dissimilar material plate that is used to generate a static charge on the duster cord.

The remote access duster consists of two separate moving mechanisms: the duster cord with the drive mechanism and the vacuum generator. In an example, it is possible to power both of these mechanisms with a single motor. The vacuum motor typically drives an impeller at a speed of 10,000 to 30,000 rpm. The drive wheel for the duster cord, depending on its diameter, will typically operate in the range of 2000 to 15,000 rpm. A belt drive with a speed reduction from the vacuum motor to the duster cord drive wheel would seem to be desirable for low-cost fabrication; however, several problems might arise from this configuration.

In operation, it is possible for the duster cord to snag on external objects or the drive mechanism. In this circumstance, it is desirable for the duster cord drive mechanism to stop to prevent damage to the duster cord, drive mechanism, or motor. If a separate motor is used to drive the duster cord, this snagged condition can be easily detected by the increased current flow to the motor. In this condition, the power to the motor can be automatically stopped and the snag easily cleared without any damage. This type of motor over-current protection is often included in small battery-powered devices and appliances.

The vacuum motor will typically require much more power than the duster cord drive. If the duster cord drive is powered by the same motor as the vacuum impeller, a snag in the duster cord would cause only a small increase in the motor current and would be difficult to reliably detect to stop the motor. Also, the high-speed vacuum motor and impeller have a significant inertia, and even if the power is stopped when the snag occurs, this stored kinetic energy can still damage the duster cord or mechanism. Another solution would be a slip-clutch between the vacuum motor and the duster cord drive mechanism. A belt drive could provide this slip-clutch mechanism. A potential problem with this technique, however, is that a significant amount of energy would be dissipated in this slip-clutch mechanism. This could result in overheating the belt and/or pulleys.

For these reasons, it is desirable to use a separate motor for the duster cord drive mechanism. In this configuration, each motor can have a separate over-current sensor. Over-current in either motor can then trigger either or both motors to be stopped.

To operate properly, the remote access duster must apply a significant linear velocity (typically 10 to 30 m/sec. depending on duster cord length and other cord characteristics) to the duster cord. To transfer this velocity from one or more drive wheels requires good traction between the wheel(s) and the duster cord. In typical mechanical systems using a belt, chain, or similar flexible loop coupling, the loop is held tight around the pulleys, wheels, sprockets, etc. The tightness of the loop creates significant friction between the belts and pulleys or keeps chains from slipping over the teeth on a sprocket to provide good traction between the flexible loop and the rotating wheels in the system. The duster cord drive may not have a secondary wheel in the system to provide tension around the driving wheel. Traction to this wheel must thus be provided in another way.

As described earlier, this traction can be provided with pinch wheels or other devices that press the duster cord against the drive wheel. These methods can provide the required traction, but increase the power required because of friction losses, increase the wear on the duster cord, and increase the complexity of the drive mechanism.

The preferred method of providing traction between the drive wheel and the duster cord is with suction from the inside of the drive wheel as described earlier. This does not add complexity to the system, as suction is already being used to remove the accumulated dust and lint from the duster cord. Openings from the inside of the drive wheel to the duster cord as it wraps around the drive wheel allow air flow from the outside to pull the duster cord against the drive wheel. A suction shield that does not rotate with the drive wheel is placed inside the drive wheel hub to stop the airflow from the suction over the part of the rotation of the drive wheel where the duster cord is not intended to stay in contact with the wheel as shown previously in FIG. 4.

If the inside surface of the drive wheel is smooth, it is difficult to get enough traction to the duster cord with suction alone. To solve this, the drive wheel can be constructed so the duster cord rides against the edges of a number of ribs or vanes that form the inside of the track of the drive wheel. Air flows between these ribs to transfer the suction from the hub of the drive wheel to the duster cord. These ribs can be designed to form a V-shaped wedge so that the duster cord is drawn into the wedge by suction. This configuration creates much greater traction to the duster cord. To provide even greater traction, the ribs or vanes in the drive wheel can alternate with the sloped wedge surface on opposites sides of the wheel for every other rib. This results in drawing the duster cord into a zig-zag shape around the ribs for even greater traction.

This alternating wedge configuration of the drive wheel is also simple to manufacture with standard plastic molding techniques. The drive wheel can be molded in two parts with one half of the ribs on each part. This allows each half of the drive wheel to be molded without undercutting so a simple molding tool can be used. It is also preferable to make the drive wheel from a somewhat flexible material, such as polyurethane, thermoplastic elastomer (TPE), thermoplastic urethane (TPU), or another elastomer. The slightly flexible material does not affect the operation of the drive wheel but provides greater safety for the operator of the remote access duster. The soft wheel may prevent injury if a finger is inserted into the drive wheel while it is operating. If the wheel is jammed by the finger, the motor will stop immediately due to the over-current shutoff.

Figures 6A, 6B, 6C:
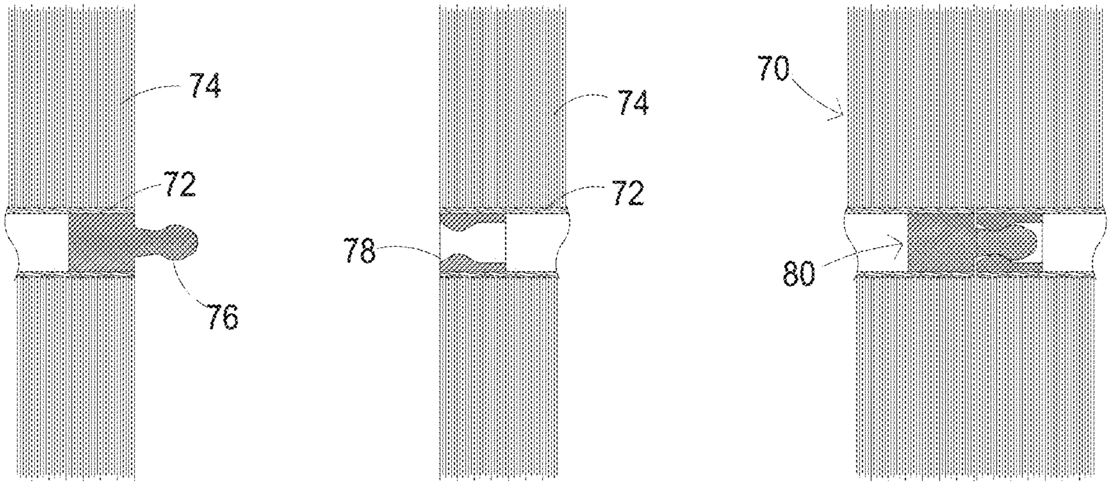
FIGS. 6A-6C show cross sections of a duster cord connector used with a cord made of a strip of faux fur. The connector is made from an elastomeric material. It leaves no gap in the fibers of the cord when connected.

With use over time, the duster cord can wear or become damaged, so it is important to be able to replace it. To make this replacement practical for the user, in an example, the duster cord has a connector 80 in it that can be easily disconnected by the user for removal and replacement. See FIGS. 6A-6C. Duster cord 70 has two ends, one end with backing 72 that carries fibers 74, with male connector 76. The other end has backing 72 that carries fibers 74, with female connector 78. Connectors 76 and 78 snap fit together to form coupling 80. This connector must have sufficient retention to hold the cord together during operation, should be easy for the user to engage and disengage, and should be small and lightweight enough so it does not disturb the motion of the duster cord or damage items the duster cord contacts in operation. It also should make the connection without a significant gap in the duster cord fibers that would disturb operation of the cord or disturb the suction that keeps the cord against the drive wheel.

As the remote access duster is used, it is moved around by the user and pointed in different directions to reach the desired locations. The duster cord is moving through the air while the position of the duster body is changed. This movement means that the returning duster cord will not necessarily approach the duster body from a perpendicular direction. For this reason, in an example, the duster body is designed with a flare around the duster cord intake position. This flare or funnel prevents excessive friction between the duster cord and the duster body due to dragging against the edges of the duster body as it enters. This flare is also designed to guide the duster cord over the edges of the drive wheel and also to reduce drag on the duster cord. In an example, the intake area of the duster body also uses the protective plates described earlier to prevent the duster cord from contacting the mating locations of the duster body components where the fibers can be snagged.

Preferred Embodiment

The preferred embodiment of this remote access duster is a handheld, battery-powered device that can be easily held, maneuvered and pointed by the user to the locations to be dusted. See FIGS. 7-11. The duster body is made from a number of molded plastic parts that form a shell with a handle that contains the features described previously. It also includes a rechargeable battery pack with an electronic control board for the battery charging and for the over-current protection described previously. A power switch is positioned near the front of the handle along with an optional indicator for battery charging, etc. An external wall-plug power supply is used for the battery charging and plugs into a connector in the duster body.

The duster cord for the preferred embodiment can be made with any of the described techniques or other techniques that produce a similar configuration. The duster cord in the preferred embodiment is approximately 150 cm total length (before being connected into a loop) though longer or shorter duster cords could be used. The fibers on the duster cord are made from polyester microfibers. The microfibers can be bundled together in small groups with separated ends, as is common with hand dusters, or they can be left completely separate such as in the case of faux fur. The length of the fibers from the central cord of the duster cord is typically 15 to 30 mm, though depending on the density (quantity per sq. cm) of the fibers and the length of the cord, longer or shorter fibers may be desirable. For example, a lower density of fibers allows them to lay closer to the core of the duster cord so longer fibers result in an overall diameter similar to a cord with shorter fibers in a higher density. Also, longer fibers create more air resistance as the duster cord is propelled outward from the duster body and thereby causes the velocity of the cord to slow more quickly. This will result in the cord drooping more at the turn-around point of the loop. A shorter total length of the duster cord would be appropriate for this condition.

Figure 7A:
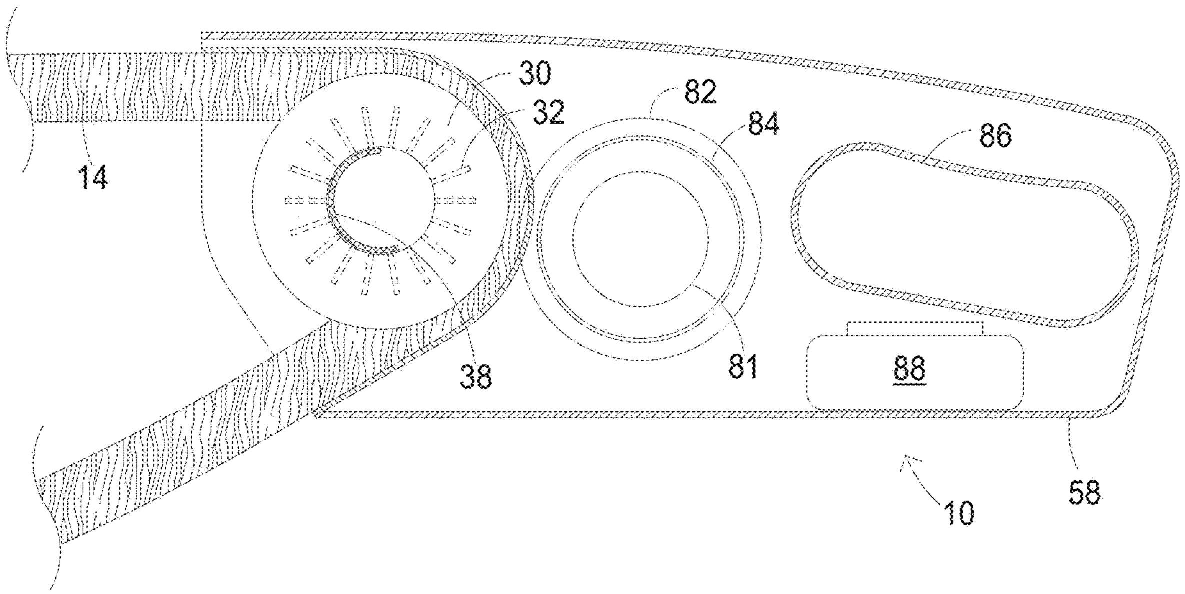
FIGS. 7A and 7B are side and top cross-sectional views, respectively, of the duster body with the major components illustrated and showing the airflow within the unit.
Figure 7B:
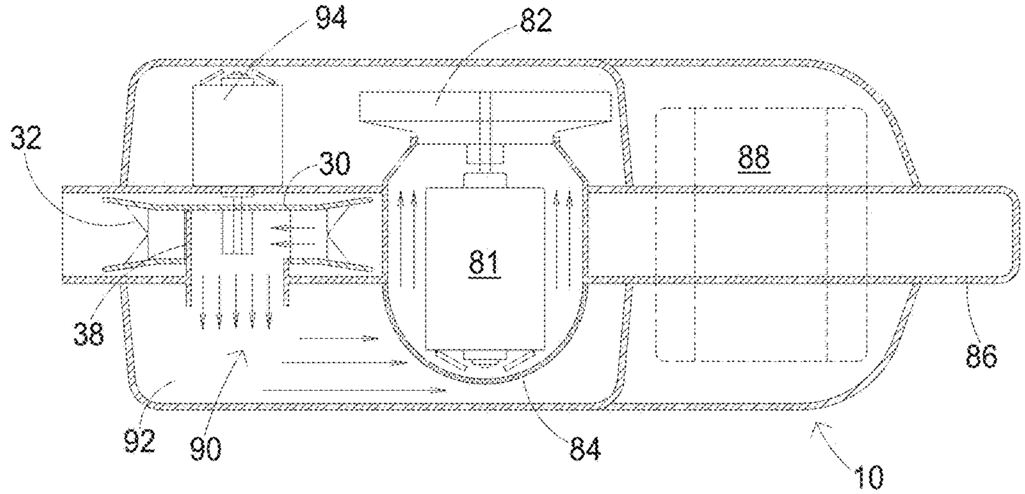

The preferred embodiment of the remote access duster uses a single drive wheel for the duster cord with a suction system to hold the cord against the drive wheel as previously described. Suction is directed to the center of the drive wheel which has a suction shield to apply suction to the portion of the wheel where the duster cord is present. This suction removes the dust and lint from the duster cord and captures it in the dust bin by using an air filter before the air passes over the vacuum motor and into the impeller. FIGS. 7A and 7B show the major components of the remote access duster 10 in the preferred embodiment. The illustrated components (FIG. 7A) include housing 58, handle 86, vacuum motor 81 that drives impeller 82, air filter 84, drive wheel 30, suction shield 38, and duster cord 14. FIG. 7B illustrates components that include handle 86, battery 88, impeller 82, drive wheel 30, suction shield 38, drive wheel motor 94, drive wheel ribs 32, dustbin 92, air flow arrows 90, air filter 84 and vacuum motor 81. These drawings intentionally leave out some of the details for clarity. They show the relative positions of these components and how the air flow passes through the components to produce the desired results.

Figure 8:
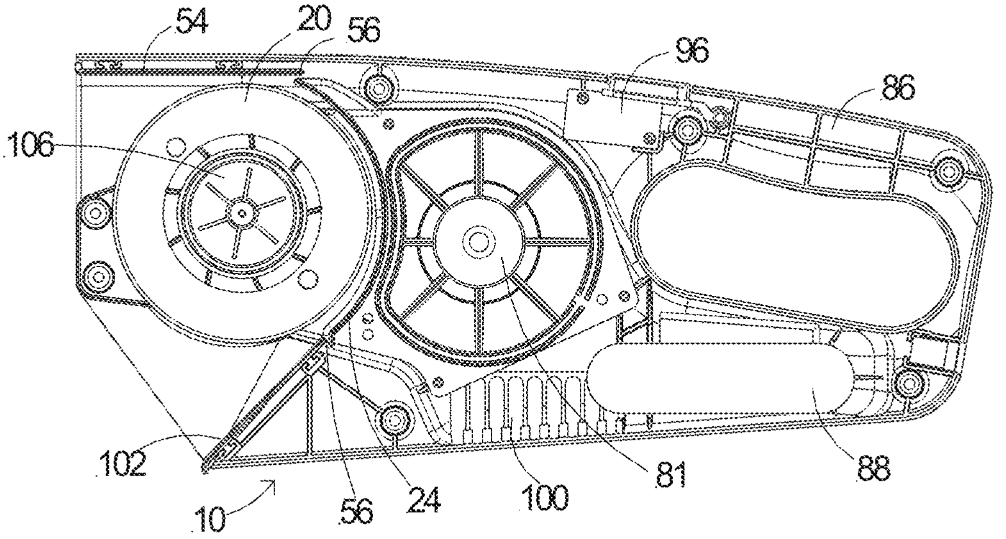
FIG. 8 is a more detailed view of the preferred embodiment of the duster body internal components with one side of the cover and the dust bin removed.
Figure 9:
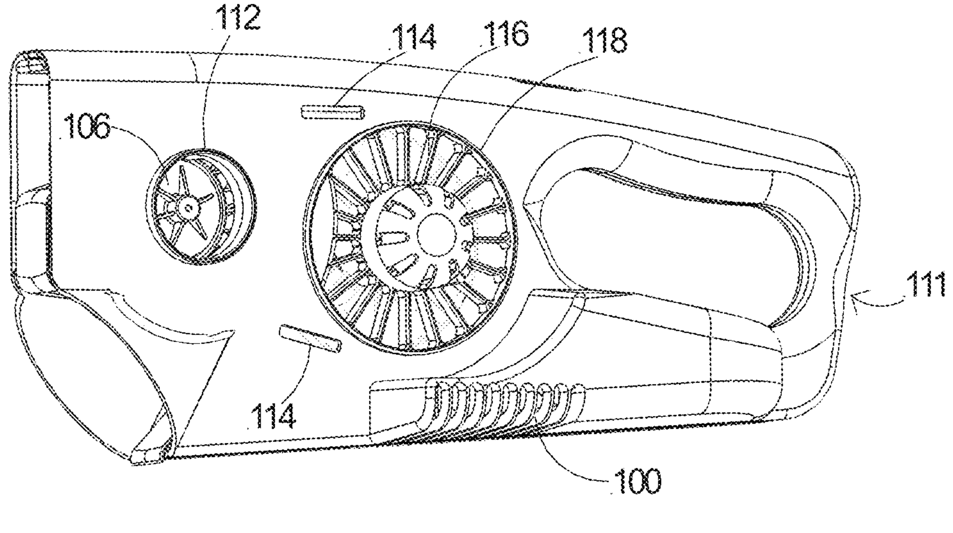
FIG. 9 is an external view of the preferred embodiment of the duster body with the dust bin removed to show the left outer shell.
Figure 10:
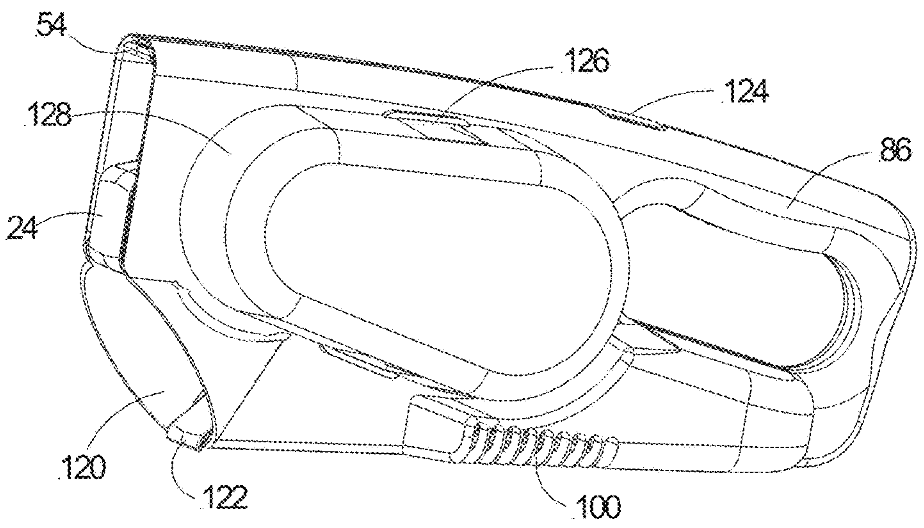
FIG. 10 is an external view of the preferred embodiment of the duster body including the dust bin.
Figure 11:
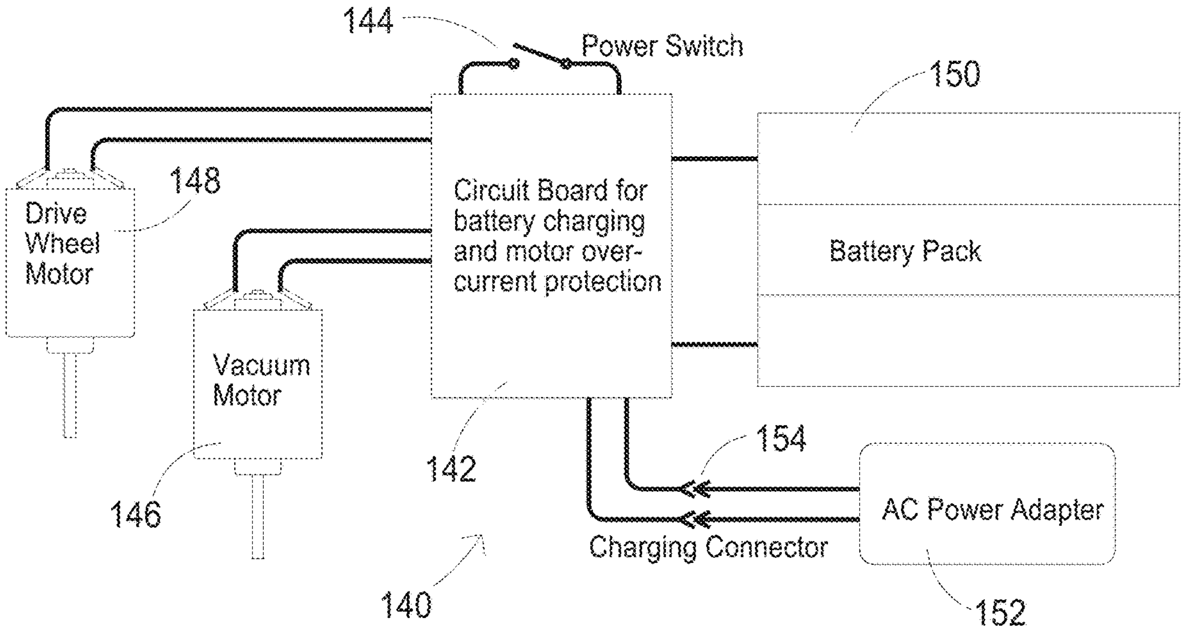
FIG. 11 is a schematic diagram of the electrical connections in the remote access duster.

FIG. 8 shows a more detailed view of the internal components of the preferred embodiment of the duster body. This is a view with the left half of the outer shell removed. Also the dustbin is not shown. This view shows how the static charge plate 54 is fitted into retainer grooves in the outer shell. The static charge plate has gaps all around it to prevent the duster cord fibers from snagging on it. The mating tongue and groove joints that mount the static charge plate are remote from the edges of the plate and in locations that cannot be reached by the fibers of the cord. The static charge plate is made from nylon or a similar material that is widely separated from polyester (duster cord fibers) on the triboelectric series. The curved duster cord guide wall 24 has an overlapping gap with the static charge plate so there are no tight clearances next to the cord. The curved duster cord guide wall is matched by a similar one on the inside of the left outer shell which is not shown in this drawing. There is a gap between these guide walls so there are no tight clearances next to the cord, or in any location the fibers of the cord can reach through the gap.

The duster cord drive wheel 20 shown in FIG. 8 is driven by a motor that is behind it and out of view in this drawing. The drive wheel hub 106 is open on the visible side in this drawing. The suction shield is part of the left outer shell and is not shown. There is a protective plate 102 in the opening for the intake of the duster cord. This plate is made much like the static charge plate and is designed to keep the duster cord fibers from reaching any locations of tight clearances in the duster body.

The vacuum motor 81 is mounted in a star-shaped frame with the vacuum impeller behind it in this drawing. The air is drawn around the motor and then into the impeller. The air guide around the motor forms a seal with the air filter at the output of the dust bin which is not shown in this drawing. The air that exits the outside of the impeller is vented out of the duster body through air vents 100 in both sides of the outer shell. The amount of suction required depends on the characteristics of the duster cord and the drive wheel; the preferred embodiment produces 5 to 10 in-$H_2O$. The vacuum motor and the drive wheel motor are both turned on when the power switch 96 is activated by the user. The motors are powered by the battery pack 88 through a circuit board mounted on the battery pack. The circuit board provides over-current protection for the motors and includes the battery charging circuitry.

The left outer shell of the remote access duster (111, FIG. 9) includes several features that are used to create an airflow channel from the vacuum motor/impeller to the hub of the drive wheel. Ridge 118 and ridge 112 are included in the left outer shell around the drive wheel hub and around the vacuum motor. These ridges engage the dustbin cover to form an air seal to conduct the airflow (and suction) between the vacuum motor/impeller and the drive wheel. The left outer shell also includes a protective cover and grill 116 over the vacuum motor to allow airflow through but keep fingers and other objects away from the motor and impeller. The outer shell also includes two holes 114 to engage the latches on the dust bin that hold it in place on the side of the duster body. Drive wheel hub 106 is also shown.

The external view of the preferred embodiment of the remote access duster (FIG. 10) shows how the left outer shell fits over the internal components, and how the dust bin fits on the outer shell. This view shows how the static charge plate 54, the intake protective plate 122 (inside of intake flare 120 for the duster cord), and the duster cord guide/wheel protector 24 mount between the two outer shells. These components are captured between the shells at locations that the fibers of the duster cord cannot reach. The component clearances close to the duster cord are all separated with gaps sufficient to avoid snagging the fibers of the cord. Power switch button 124, dust bin latch 126, and dust bin with air filter inside 128 are shown.

The dust bin attaches to the outside of the left outer shell. It is held in place with two spring loaded clips that can be actuated by hand to remove the dust bin for emptying. The dust bin conducts the airflow (and suction) between the vacuum motor and the hub of the drive wheel. The dust bin includes an internal cover over its open end that is adjacent to the left outer shell. This internal cover seals to the edges of the dust bin and to the left outer shell in the locations of the vacuum motor and the drive wheel hub. An air filter is integrated into the dust bin cover where the air is drawn into the left outer shell near the vacuum motor. This filter keeps the accumulated dust and lint inside the dust bin and prevents it from passing through to the vacuum motor and impeller. The dustbin cover also includes a movable flap over the opening that connects to the drive wheel hub. This flap is pulled open by the airflow when the vacuum motor is operating but covers the opening when the dust bin is removed to prevent the accumulated dust and lint from falling out until the dust bin cover is removed for emptying.

The dustbin fits together with its cover to form an airflow path from the vacuum system to the center of the drive wheel. The flexible dust bin cover fits against the ridges in the outer shell of the duster to form air seals. There is a mounting ridge for the air filter in the dustbin cover. The two halves of duster cord guide walls described previously have a gap between them to prevent snagging the duster cord. The wheel protector and duster cord guide are attached to the duster body with gaps around the edges as previously described.

With the suction applied to the center of the drive wheel, it is useful to contain the airflow to the location where the duster cord is to be held against the drive wheel. This requires rotating air seals around the drive wheel hub and between the drive wheel and the suction shield. These air seals are not complete seals but are designed to limit the air movement across them while keeping the components from contacting each other to limit friction. The "seals" are formed with a blade that fits into a groove. The air leakage must pass through the groove and around the blade. This path creates significant resistance to the air flow to minimize leakage without having rotating components that touch stationary components and create friction and wear.

The vacuum system is made in the same way as those used in existing handheld vacuum cleaners. It consists of a high-speed motor (approximately 16,000 to 18,000 rpm in this configuration) with a vacuum impeller directly mounted on the motor shaft. The impeller intake section rotates inside an air guide, in this case made of molded plastic, that also holds the motor in the correct position. The clearance between the impeller and the air guide is as small as practical to minimize air loss through this gap. There can be a bearing at the end of the motor shaft beyond the impeller. This bearing is typically not required but can be included if the specific motor used does not have sufficiently rigid shaft bearings.

The electrical wiring in the preferred embodiment of the remote access duster is very similar to that of a small handheld vacuum cleaner. See schematic 140, FIG. 11. The major difference is that the remote access duster has two motors (vacuum motor 146 and drive wheel motor 148) instead of only one. The motor control circuit on circuit board 142 has two separate motor over-current sensors, either one of which will stop both motors. The battery pack 150 used is also similar to those used in handheld vacuum cleaners and is typically in the range of 10V to 16V, though lower voltage batteries may be used for smaller units and higher voltage batteries might be needed for larger units. The battery type could be lithium, nickel-metal-hydride, nickel-cadmium, lead-acid, or any other type that can provide relatively high current (5-15 amps). Lithium batteries are preferred because they are lighter in weight and tend to have better performance than the other types, though presently somewhat more expensive. AC power adapter 152 can be removably connected to charging connector 14 to recharge the battery pack. Power switch 144 is shown.

Remote-Access Duster Alternate Embodiment

Figure 12:
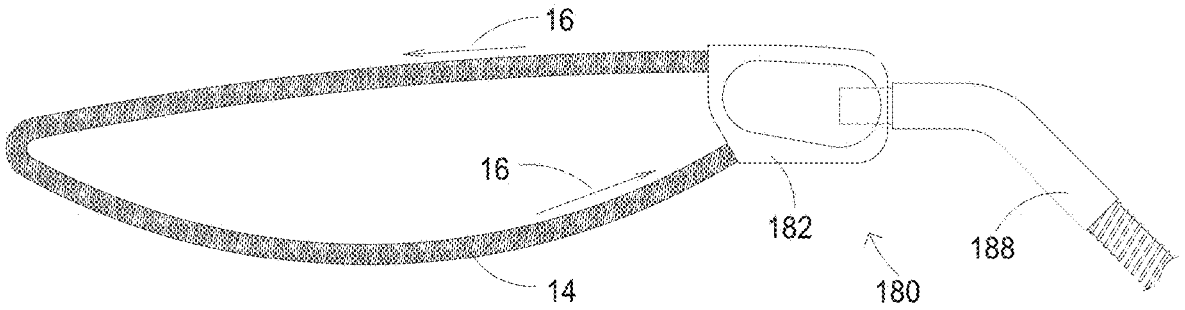
FIG. 12 illustrates the remote access duster implemented as an attachment to a standard household vacuum cleaner.
Figure 13A:
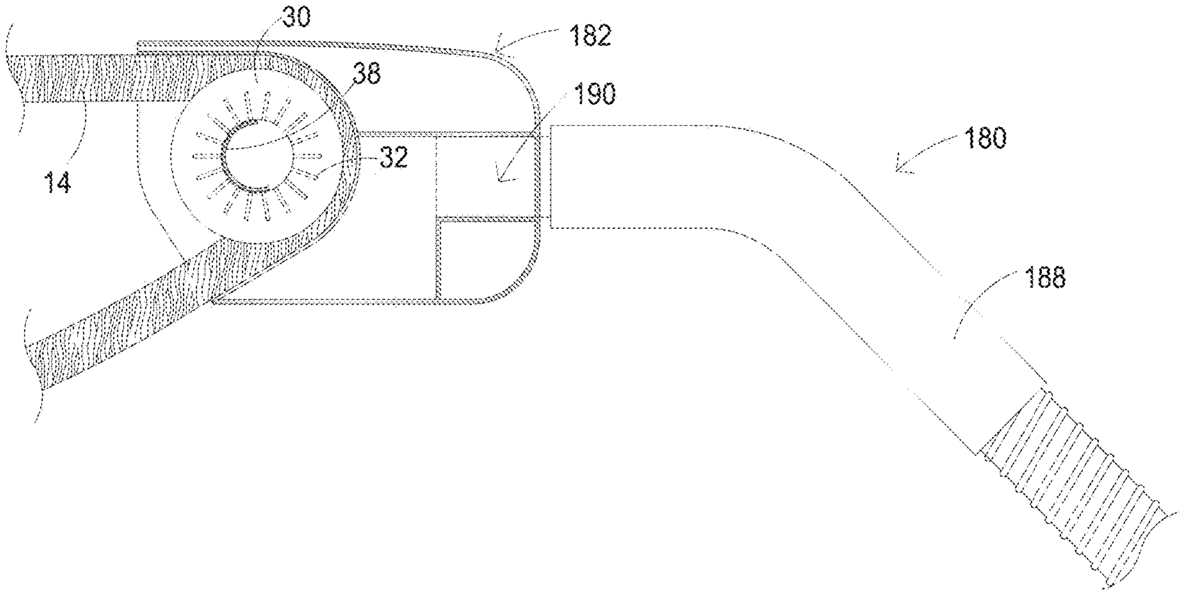
FIGS. 13A and 13B are side and top cross-sectional views, respectively, illustrating the internal working of a vacuum cleaner attachment remote access duster wherein a vacuum motor is not required as suction is applied by a hose to a household vacuum cleaner, which also collects the dust.
Figure 13B:
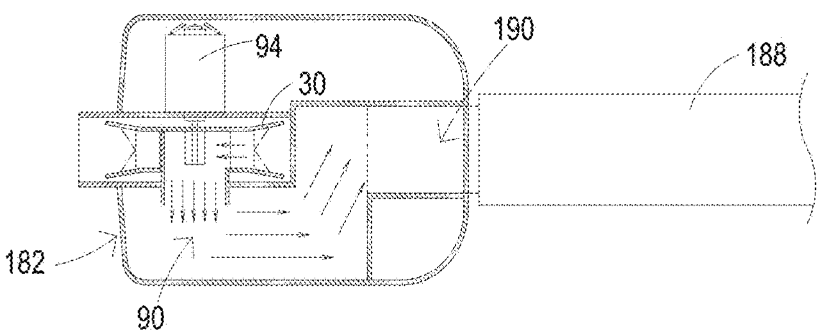

An alternate embodiment 180 is implemented as an attachment 182 to a standard household vacuum cleaner. This embodiment uses an existing vacuum cleaner to create the suction used to hold the duster cord against the drive wheel and to remove and collect the dust from the duster cord. See FIGS. 12 and 13A-13B.

The features, operational principles, and characteristics of this embodiment are similar to the preferred embodiment except that the suction is created by an existing vacuum cleaner and conducted to the duster with a hose 188, and the dust collection filter is unnecessary as the dust is collected in the vacuum cleaner. Air flow is illustrated by arrows 90.

Many types of standard household vacuum cleaners include a flexible hose to conduct the suction to one of a variety of different attachments for different applications. The duster attachment 182 is designed to connect to the vacuum cleaner hose 188 in the same position 190 as the attachments that are typically supplied with the vacuum cleaner. The design of the hose connection to the attachments is not completely standardized across different manufacturers, so the duster may be made to fit connections from one or more manufacturers and/or include adapters to fit others. Small portable vacuum cleaners may not include a hose for accessory attachment, so this embodiment of the duster can be attached directly to the vacuum intake.

Vacuum cleaner hoses or attachment fittings are sometime designed to provide power to the attachments by electrical connections for the attachment. The duster attachment can include a connection to this electrical power from the hose to operate the duster cord drive motor. The power provided by the vacuum cleaner hose is typically AC line voltage (115 VAC in the U.S.) but could be battery power from small portable vacuum cleaner units. A duster cord drive motor 94 can be used that is operated directly from this voltage, or an adapter can be included in the duster attachment to provide a different voltage to the drive motor. The duster attachment 182 can also be designed with internal batteries for use with vacuum cleaners that do not provide power to the hose connection.

An alternative method of driving the duster cord is to use the airflow from the vacuum cleaner to provide the energy. This can be done by using the airflow into the vacuum to directly pull on the cord to provide motion, or to drive a paddle wheel or turbine that is coupled to the duster cord drive wheel. In this configuration, the duster attachment may not require an electric motor or any electrical connections to the vacuum cleaner.

Many household vacuum cleaners that provide power through the hose also have a switch in the handle at the end of the hose to turn the power on or off to the attachment. For compatibility with vacuum cleaners that do not have this switch a switch can be included in the duster attachment. As described in the preferred embodiment, this attachment should include an over-current shutdown capability to stop the power to the drive motor if it stalls. The switch on the duster attachment can be used to reset this shutdown circuit.

A number of implementations have been described. Nevertheless, it will be understood that additional modifications may be made without departing from the scope of the inventive concepts described herein, and, accordingly, other examples are within the scope of the following claims.

What is claimed is:

1. A remote access duster, comprising:

a body;

a flexible duster cord loop that is configured to be propelled by a cord drive wheel such that part of the loop moves outward from the body while another part moves inward toward the body; and a vacuum motor that is configured to draw air over the cord.

2. The remote access duster of claim 1, further comprising structure in the body that is adapted to create a static electric charge on the cord.

3. The remote access duster of claim 2, wherein the structure in the body that is adapted to create a static electric charge on the cord comprises a plate that is positioned such that the cord contacts the plate.

4. The remote access duster of claim 1, wherein the cord comprises a core that carries fibers, wherein the fibers comprise a first material and the structure in the body that is adapted to create a static electric charge on the cord comprises a second material, and wherein the first and second materials are in different locations of the triboelectric series.

5. The remote access duster of claim 1, wherein the cord drive wheel is configured to be driven by a drive motor, wherein the cord is propelled by the drive wheel.

6. The remote access duster of claim 5, wherein the drive wheel comprises a plurality of openings, and wherein the vacuum motor is configured to draw air over the cord and through the openings.

7. The remote access duster of claim 1, wherein the body is configured such that there are no tight crevices that can be contacted by the cord.

8. The remote access duster of claim 1, wherein the cord comprises a core covered with projecting fibers.

9. A remote access duster, comprising:

a body;

a flexible duster cord loop that is configured to be propelled by a cord drive wheel such that part of the loop moves outward from the body while another part moves inward toward the body; and an adapter that is configured to couple the body to a vacuum cleaner such that air is drawn over the cord.

10. The remote access duster of claim 9, further comprising structure in the body that is adapted to create a static electric charge on the cord.

11. The remote access duster of claim 10, wherein the structure in the body that is adapted to create a static electric charge on the cord comprises a plate that is positioned such that the cord contacts the plate.

12. The remote access duster of claim 9, wherein the cord comprises a core that carries fibers, wherein the fibers comprise a first material and the structure in the body that is adapted to create a static electric charge on the cord comprises a second material, and wherein the first and second materials are in different locations of the triboelectric series.

13. The remote access duster of claim 9, wherein the cord drive wheel is configured to be driven by a drive motor, wherein the cord is propelled by the drive wheel.

14. The remote access duster of claim 13, wherein the drive wheel comprises a plurality of openings, and wherein the vacuum is configured to draw air over the cord and through the openings.

15. The remote access duster of claim 9, wherein the body is configured such that there are no tight crevices that can be contacted by the cord.

16. The remote access duster of claim 9, wherein the cord comprises a core covered with projecting fibers.

17. A remote access duster, comprising:

a body;

a flexible duster cord loop that is configured to be propelled by a cord drive wheel such that part of the loop moves outward from the body while another part moves inward toward the body; and a vacuum source that is configured to draw air over the cord.

18. The remote access duster of claim 17, further comprising structure in the body that is adapted to create a static electric charge on the cord.

19. The remote access duster of claim 17, wherein the cord drive wheel is configured to be driven by a drive motor, wherein the cord is driven by the drive wheel.

20. The remote access duster of claim 19, wherein the drive wheel comprises a plurality of openings, and wherein the vacuum source is configured to draw air over the cord and through the openings.

* * * * *